United States Patent [19]

Jaeger

[11] Patent Number: 5,190,667
[45] Date of Patent: Mar. 2, 1993

[54] SEPARATION OF GASES AND SOLUTES BY AUGMENTED DIFFUSION IN COUNTERFLOW

[75] Inventor: Marc J. Jaeger, Gainesville, Fla.

[73] Assignee: University of Florida, Gainesville, Fla.

[21] Appl. No.: 717,654

[22] Filed: Jun. 19, 1991

[51] Int. Cl.$^5$ .................. B01D 17/06; B01D 15/04
[52] U.S. Cl. .................. 210/748; 210/637;
210/638; 210/388; 55/15; 55/66; 55/266;
204/157.2
[58] Field of Search .............. 210/748, 388, 638, 637;
55/15, 17, 158, 66, 266; 204/157.2, 157.62

[56] References Cited

U.S. PATENT DOCUMENTS

| | | | |
|---|---|---|---|
| 4,166,727 | 9/1979 | Pinto de Novais Paiva | 55/17 |
| 4,197,094 | 4/1980 | Eisenkraft | 55/17 |
| 4,743,361 | 5/1988 | Schram | 210/748 |
| 4,770,675 | 9/1988 | Kurzweg et al. | 55/15 |
| 4,844,814 | 7/1989 | Jaeger | 210/748 |

OTHER PUBLICATIONS

Marc J. Saeger et al., "Separation of Gases by Enhanced Upstream Diffusion", Separation Science and Technology, 27(6), pp. 691-702, 1992.

Primary Examiner—Robert A. Dawson
Assistant Examiner—Ana M. Fortuna
Attorney, Agent, or Firm—Kerkam, Stowell, Kondracki & Clarke

[57] ABSTRACT

A method and systems for separating fluids of differing masses from a mixture by enhanced diffusion wherein the method and systems embody at least one cycle wherein the mixture of fluids of differing masses is fed into a first reservoir which is connected by at least one duct to a second reservoir; a carrier fluid is fed into a second reservoir; oscillatory axial movement of fluid within the at least one duct is established; a mixture of carrier fluid and a mixture of fluids of differing masses enriched in the component thereof having higher effective diffusion coefficient is withdrawn from the second reservoir; a mixture of carrier fluid and a mixture of fluids of differing masses enriched in the component thereof having the lower effective diffusion coefficient is withdrawn from the first reservoir; such that a positive flow of the carrier fluid is maintained from the second reservoir through the at least one duct into the first reservoir.

46 Claims, 7 Drawing Sheets

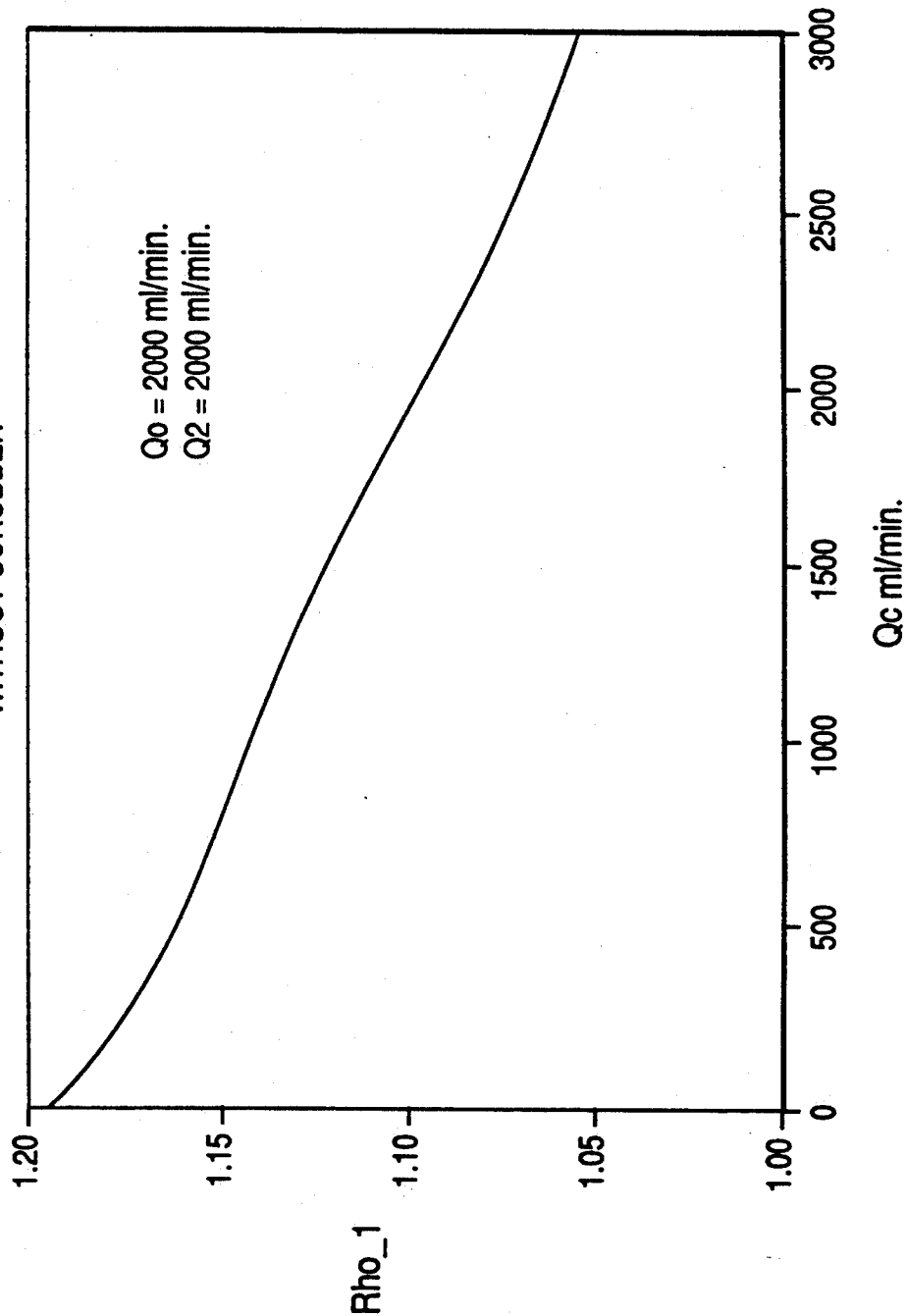

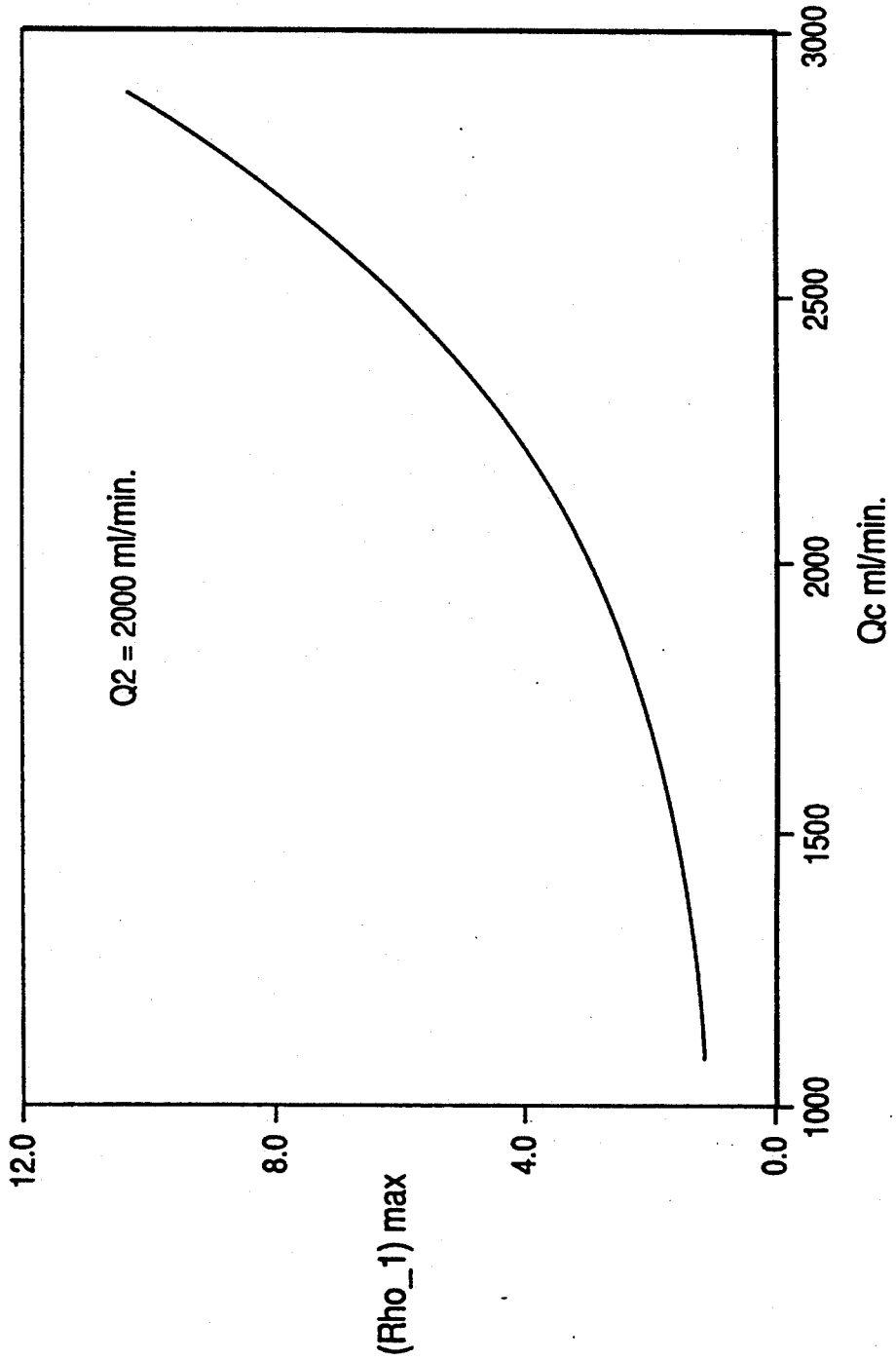

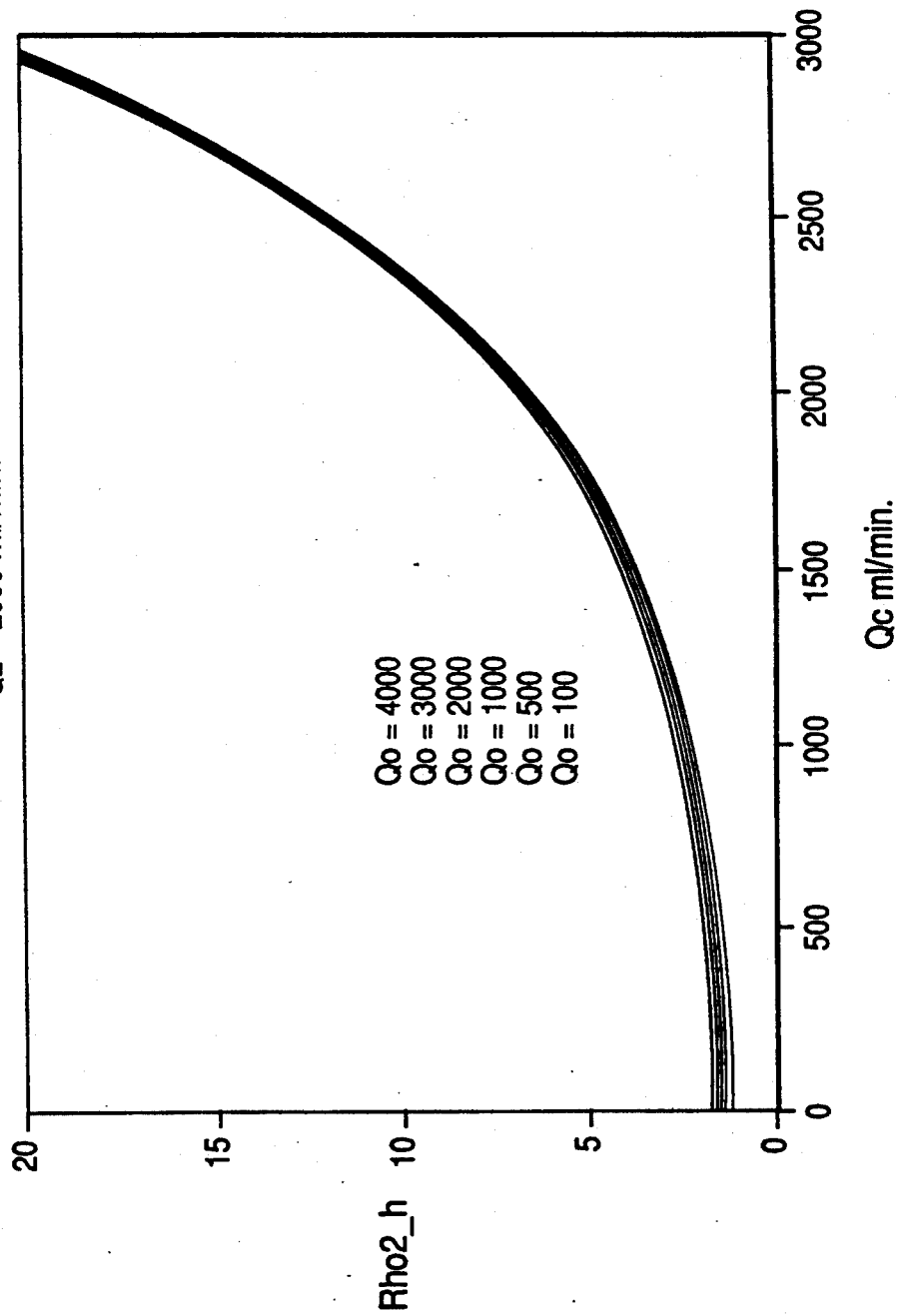

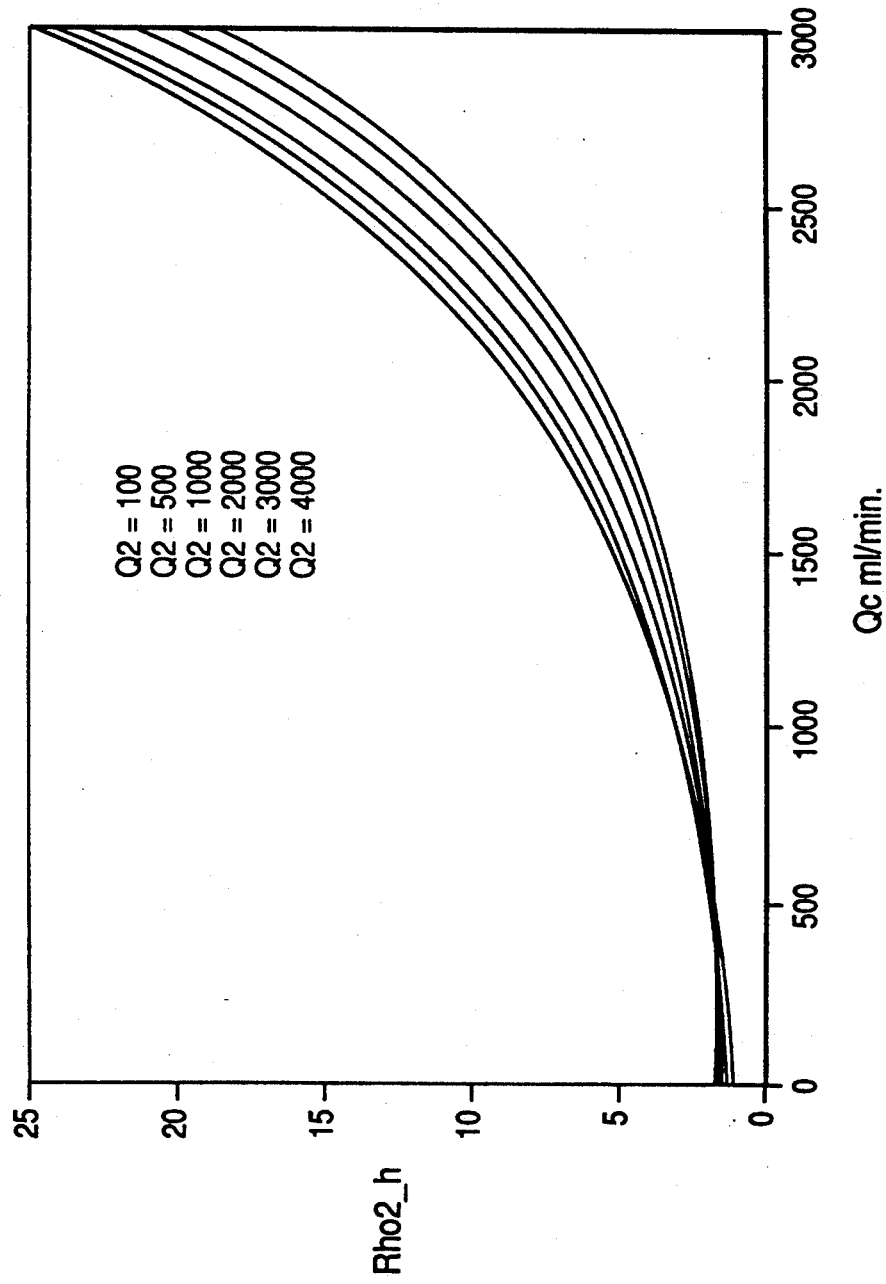

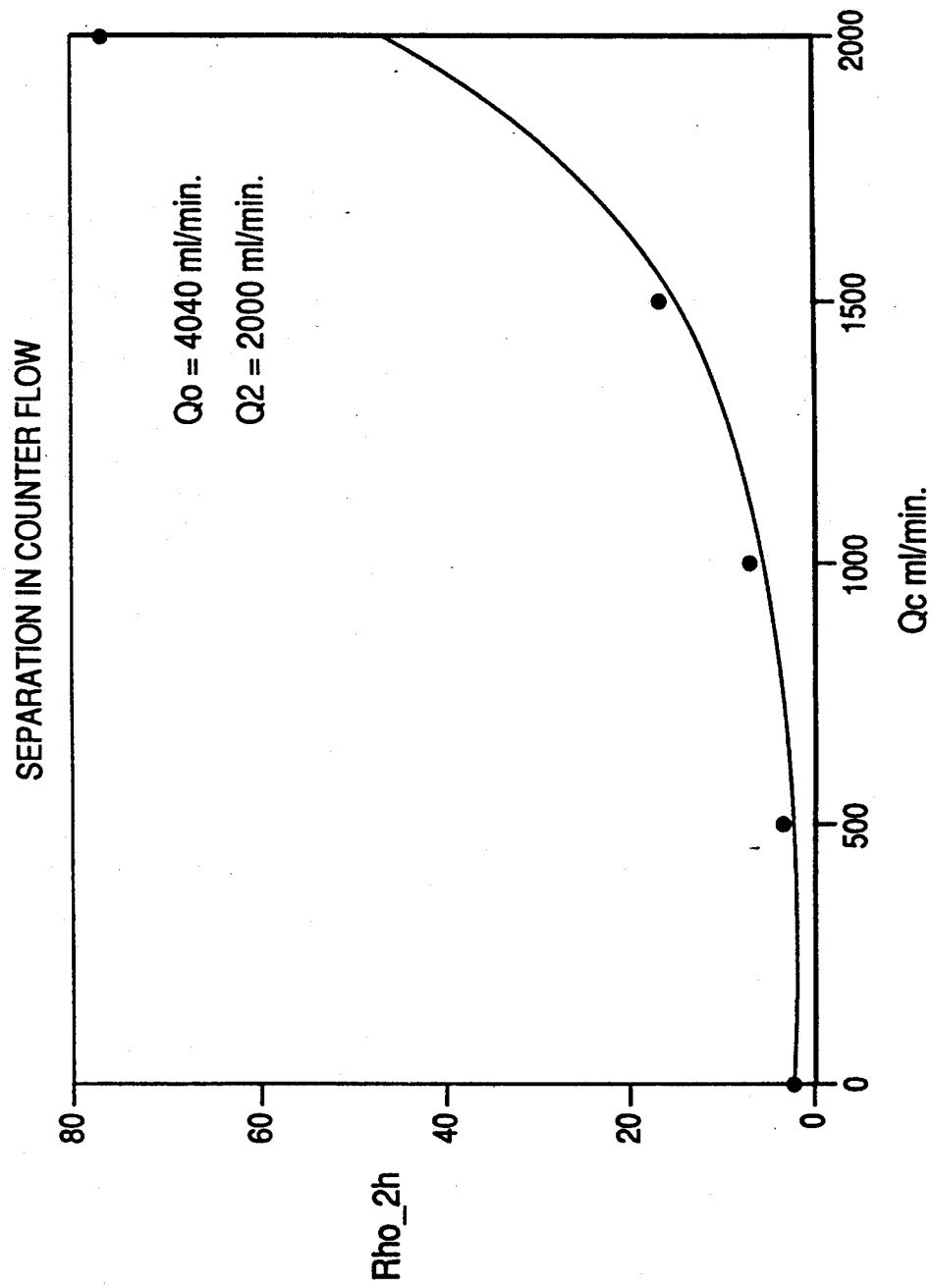

SEPARATION OF GASES AND SOLUTES BY AUGMENTED DIFFUSION IN COUNTERFLOW

Research leading to the completion and reduction to practice of the invention was supported in part by U.S. Navy Grant No. N 00014-86-K-0123. The United States Government has certain rights to the invention described herein.

BACKGROUND OF THE INVENTION

1. Field of the Invention

The present invention relates to the separation of solutes dissolved in liquids and gases of differing masses and to the separation of particulates suspended in gases or liquids and to the separation of liquids of different densities.

2. Discussion of the Prior Art

Diffusion has long been employed to separate molecules. Graham ["On the law of diffusion of gases," Philosophical Magazine, Vol. 2, pp. 175-351 (1833)], who first related the molecular diffusion coefficient to the square root of molecular weight, separated gases based upon this principle in the 19th century. Hertz developed a technique based on diffusion to separate gases in a countercurrent system [Z. Physik., Vol. 19, p. 35 (1923) and Vol. 91, p. 810 (1934)].

This technique was extended to liquids by Lange [Z. Naturwiss., Vol. 16. p. 115 (1928) and Vol. 17, p. 228 (1928)]. There is evidence that students of Lange expanded on this work and reported their results in papers published in East Germany that are not readily available. East German Patent No. 54,339 describes the method of Lange as one involving the enhancement of the diffusion rate by oscillations and regeneration of the solvent by successive distillation and condensation.

Dreyer et al [Die Steigerung des Diffusions-transportes durch Pulsationsdiffusion, Z. Naturforsch., Vol. 23, pp. 498-503 (1968) and Die Bestimmung von Diffusionskoeffizienten nach der Pulsationsmethode, Z. Naturforsch., Vol. 24, pp. 883-886 (1969)] describe a system for determining the diffusion coefficients of solutes such as KC, NaCl and $CaCl_2$ comprising two containers connected by a capillary and a mechanism for creating pulsating oscillations in the liquid contained in the capillary. The authors discovered an enhancement of transport of several orders of magnitude.

Modified principles of diffusion are used industrially today, especially to separate isotopes of uranium. Diffusion has been used to separate solutes in liquid solution; however, the efficacy of the process is low because the molecular diffusion coefficient of solutes in liquids is about five orders of magnitude smaller than the diffusion coefficient of gases in a gaseous phase, thus reducing the possible yield for a given configuration.

Enhanced diffusion (or dispersion) by oscillatory motion of a fluid finds its roots in the theoretical work by Watson [J. Fluid Mech., Vol. 133, p. 233 (1983)] who himself expanded on a study by Taylor on the dispersion of solutes in steady laminar flow [Proc. R. Soc. London Ser. A 219, p. 186 (1953)]. Kurzweg et al recently described the conditions of optimal transport in gases and liquids by proper tuning of the experimental variables [Phys. Fluids, Vol. 29, p. 1324 (1986)]. See also Harris et al, Chem. Eng. Sci., Vol. 22, pp. 1571-1576 (1967); and Kurzweg et al, Phys. Fluids, Vol. 27, pp. 1046-1048 (1984). The principle evolved from the work of Taylor et al (Proc. R. Soc. London Ser. A 219, pp. 186-203 (1953). The concept has found medical application [Slutzky et al, Science, Vol. 209, pp. 609-611 (1980) and Chang, J. Appl. Physiol., Vol. 56, pp. 556-563 (1984)].

The general principle involved may be described thusly: The oscillation of a fluid column in a tube generates a large surface between the oscillating core and the boundary layer which is essentially not moving. This surface is made available for diffusion. The theory predicts that, under certain conditions, the dispersion coefficient (i.e., the effective diffusion coefficient) is proportional to:

(a) the square of the frequency (in gases) or to the square root of the frequency (in liquids) or, under some conditions, to a power function of frequency between 0.5 and 2.0;

(b) the square of the oscillation amplitude $\Delta x$ (defined hereinbelow); or (c) either the molecular diffusion coefficient $D_m$ (in liquids) or the reciprocal value of this coefficient $1/D_m$ (in gases) or, under some conditions, a value between these extremes.

Systems have been developed for the industrial application of these techniques for separating gases and solutes. See Kurzweg and Jaeger, U.S. Pat. No. 4,770,675; Jaeger, U.S. Pat. No. 4,844,814; Jaeger and Kurzweg, "Determination of the longitudinal dispersion coefficient in flows subjected to high frequency oscillations," Phys. Fluids, Vol. 26, pp. 1380-1382 (1983); and Kurzweg and Jaeger, "Tuning effect in enhanced gas dispersion under oscillatory conditions, " Phys. Fluids, Vol. 29, pp. 1324-1326 (1986).

As discussed above, diffusion against a steady flow was described by Hertz in 1923 with the intention of separating gases of differing molecular weights. The solution of the Fick equation for a counterflow with a flow rate $Q_c$ gives $$\ln(c_1/c_2) = LQ_c/AD_m \qquad (1)$$

where c refers to the concentration, L to the length of the diffusing path in cm, A to the cross-sectional area in $cm^2$ and $D_m$ to the molecular diffusion coefficient in $cm^2/sec$; the indices 1 and 2 refer to the high and low ends of the diffusion gradient, respectively. For comparison, the classical equation describing diffusion without counterflow is $$c_1 - c_2 = \dot{q}L/AD_m \qquad (2)$$

where $\dot{q}$ is the flux of the diffusing molecule(s). Equation (1) used by Hertz provides potentially superior separation because of the logarithmic relationship; however, theoretically, the method provides for no flux, i.e., for no technically usable yield.

It is an object of the present invention to provide a hybrid system which combines the principles embodied in Equations (1) and (2) to provide an improved method for separating gases and solutes of differing masses.

SUMMARY OF THE INVENTION

The foregoing and other objects are realized by the present invention, one embodiment of which provides a method for separating gases or liquids of differing masses from a gas or liquid mixture by enhanced diffusion comprising conducting at least one cycle of feeding said mixture of gases or liquids of differing masses into a first reservoir which is connected by at least one duct to a second reservoir; feeding a carrier fluid (gas or liquid) into the second reservoir; establishing oscillatory axial movement of fluid within the at least one duct; withdrawing from the second reservoir a mixture of carrier fluid and a mixture of gases or liquids of differing masses enriched in the component thereof having the higher effective diffusion coefficient; withdrawing from the first reservoir a mixture of carrier fluid and a mixture of gases or liquids of differing masses enriched in the component thereof having the lower effective diffusion coefficient; wherein a positive flow of the carrier fluid is maintained from the second reservoir through the at least one duct into the first reservoir. As will be understood by those skilled in the art, where a mixture of gases is to be separated, the carrier fluid is a gas; where the mixture to be separated is liquid, the carrier fluid is a liquid. An additional embodiment of the present invention comprises a system for separating fluids of differing masses from a mixture thereof by enhanced diffusion comprising at least one fluid separating device comprising a pair of first and second fluid reservoirs, each having fluid inlet and outlet means; at least one duct connecting the fluid reservoirs and means for establishing oscillatory axial movement of fluid within the at least one duct; one of the inlet means being adapted for feeding into the mixture of fluids of differing masses; the other of the inlet means being adapted for feeding a carrier fluid into the second fluid reservoir; one of the outlet means being adapted for the withdrawal from the second reservoir a mixture of carrier fluid and a mixture of fluids of differing masses enriched in the fluid component having the higher effective coefficient of diffusion and the other of the outlet means being adapted for the withdrawal from the first reservoir a mixture of carrier fluid and a mixture of fluids of differing masses enriched in the component having the lower effective coefficient of diffusion; and means for maintaining a positive flow of the carrier fluid from the second fluid reservoir through the at least one duct into the first fluid reservoir.

A third embodiment of the present invention comprises a method for separating solutes or particulates of differing masses from a mixture thereof contained in a liquid and from each other by enhanced diffusion comprising conducting at least one cycle of feeding a first liquid containing a member selected from the group consisting of a mixture of the solutes of differing masses to be separated, a mixture of particulates of differing masses to be separated or a mixture of at least one solute and at least one particulate of differing masses to be separated into a first reservoir which is connected by at least one duct to a second reservoir; feeding into the second reservoir a second carrier liquid capable of receiving and containing the solutes or particulates; establishing oscillatory axial movement of liquid within the at least one duct; withdrawing from the second reservoir a liquid containing the member enriched in the components thereof having a higher effective coefficient of diffusion; withdrawing from the first reservoir a liquid containing the member enriched in the components thereof having a lower effective coefficient of diffusion; wherein a positive flow of the carrier liquid is maintained from the second reservoir through the at least one duct into the first reservoir.

A final embodiment of the invention comprises a modification of the above method and system for separating particulates, as well as gases of differing masses from each other or from gases in which they are suspended.

BRIEF DESCRIPTION OF THE DRAWINGS

FIGS. 3–7 are graphical depictions of the results of methods according to the invention.

DETAILED DESCRIPTION OF THE INVENTION

The present invention is predicated on the discovery that the separation of solutes in liquid and gases by oscillatory diffusion in a carrier fluid, described, e.g., in U.S. Pat. Nos. 4,770,675 and 4,844,814, can be unexpectedly improved by a factor of 10 or more when the diffusion takes place against a steady flow of the carrier fluid.

The method and systems of the invention are based on augmented diffusion of the gases and solutes induced by tuned oscillation of the carrier fluid and on diffusion in counterflow, which permits one to vary the separation factor, a highly unusual and unexpected feature in diffusional separation. Under some conditions, the separation factor is significantly better than the ratio of the diffusion coefficients of the materials to be separated.

Thus, the systems and method of the present invention are based on a hybrid diffusion wherein there is both flux and counterflow, the flux being enhanced by tuned oscillations.

Figure 1:
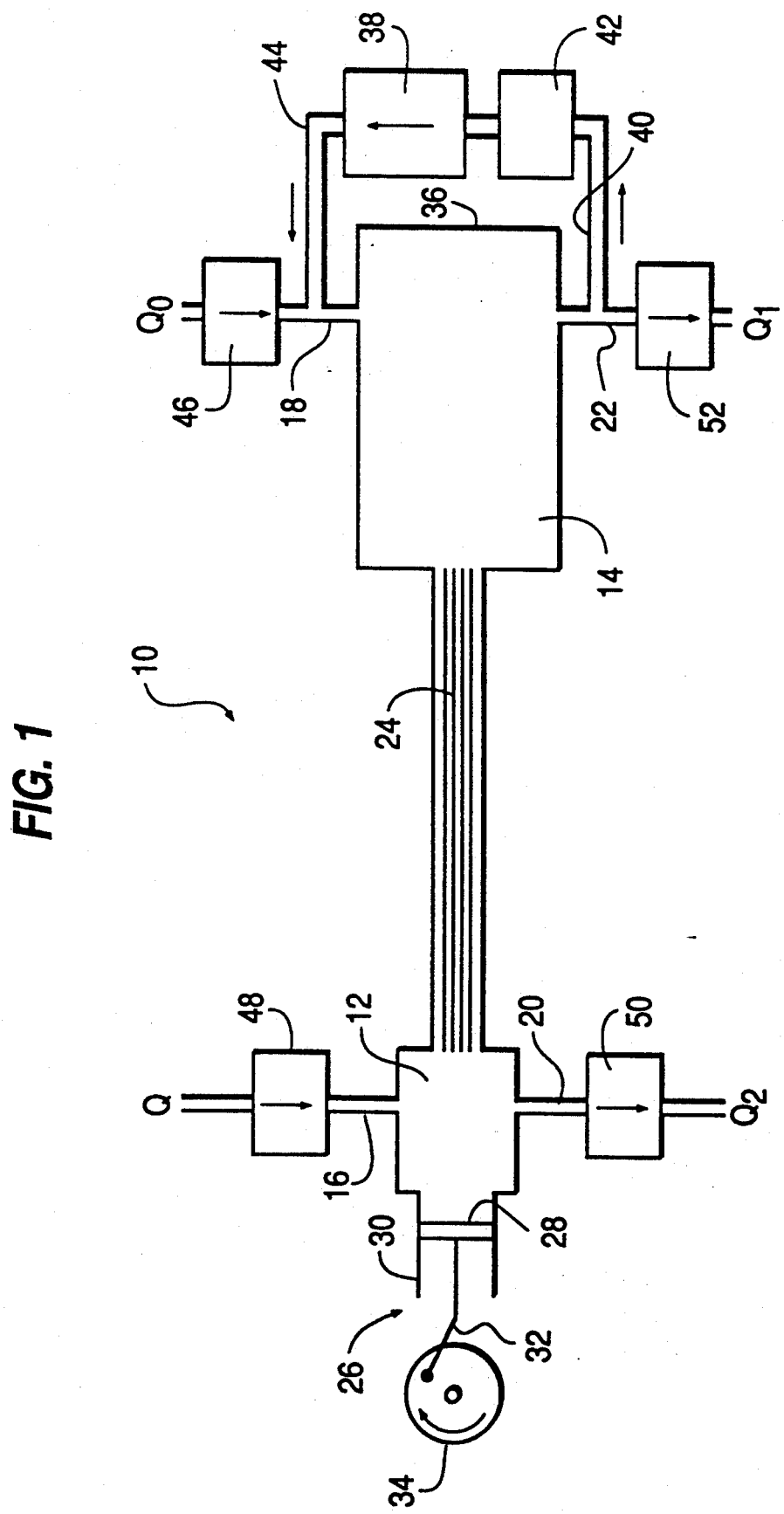
FIG. 1 is a diagrammatical sectional view of an embodiment of an augmented diffusion cell system according to the invention.

Referring to FIG. 1, a fluid separating device 10 in accordance with the invention includes a pair of fluid reservoirs 12 and 14 equipped with fluid inlets 16 and 18, respectively, and fluid outlets 20 and 22, respectively. The two reservoirs 12 and 14 are connected by at least one, preferably a plurality of, duct(s) 24. The ducts preferably have a diameter of from 1 to about 5 mm.

The reservoirs 12 and 14 and the ducts 24 are adapted to receive, hold and transfer gases and liquids containing dissolved solutes or suspended particulates.

Acting on the fluid between the reservoirs 12 and 14, in this embodiment, within reservoir 12 is an oscillatory displacement device 26. As a representative example, the oscillatory displacement device 26 comprises a driving piston 28 reciprocating within a cylindrical bore 30 in direct communication with the reservoir 12 and driven via a shaft 32 by an external mechanical oscillator 34. Typically, the driving piston 28 oscillates sinusoidally; however, any suitable oscillation wave form may be used.

Since liquid is substantially incompressible, in order to keep the system entirely filled at all times with no voids or dilutions of the mixture, displacement accommodating device 36 is connected to reservoir 14. In the embodiment shown, the displacement accommodating device 36 comprises what may be viewed as a passive resilient member, preferably a membrane.

With this arrangement, as the piston 28 oscillates, fluid moves alternately axially in opposite directions within the ducts 24. The displacement accommodating member 36, due to its resilient nature, returns energy to the driving piston 28. The displacement accommodating member 36 is preferably a resilient membrane.

A typical condenser evaporator 38 is shown which is capable of partially removing the carrier fluid from mixtures entering therein through inlet 40 via pump 42 by having it condense where the fluid is a gas along condenser plates (not shown), cooled by a coolant and collecting in liquid form at the bottom of the condenser. When the fluid is a liquid, the carrier may be evaporated and ultimately condensed in a similar manner. The condensed carrier may be withdrawn from the bottom of condenser 38 via an outlet (not shown) and recycled as carrier into the second reservoir 12 via inlet Q. The mixture of gases or liquids, enriched in the lighter component, is recycled through duct 44 into the first reservoir 14. This condenser could also be replaced by a chemical absorptin system which can remove the carrier as effectively as a condenser.

Pumps 46 and 48 control $Q_0$ and Q, the inflows into reservoirs 14 and 12, respectively. Pumps 50 and 52 control $Q_2$ and $Q_1$, the outflows of reservoirs 12 and 14, respectively.

Figure 2:
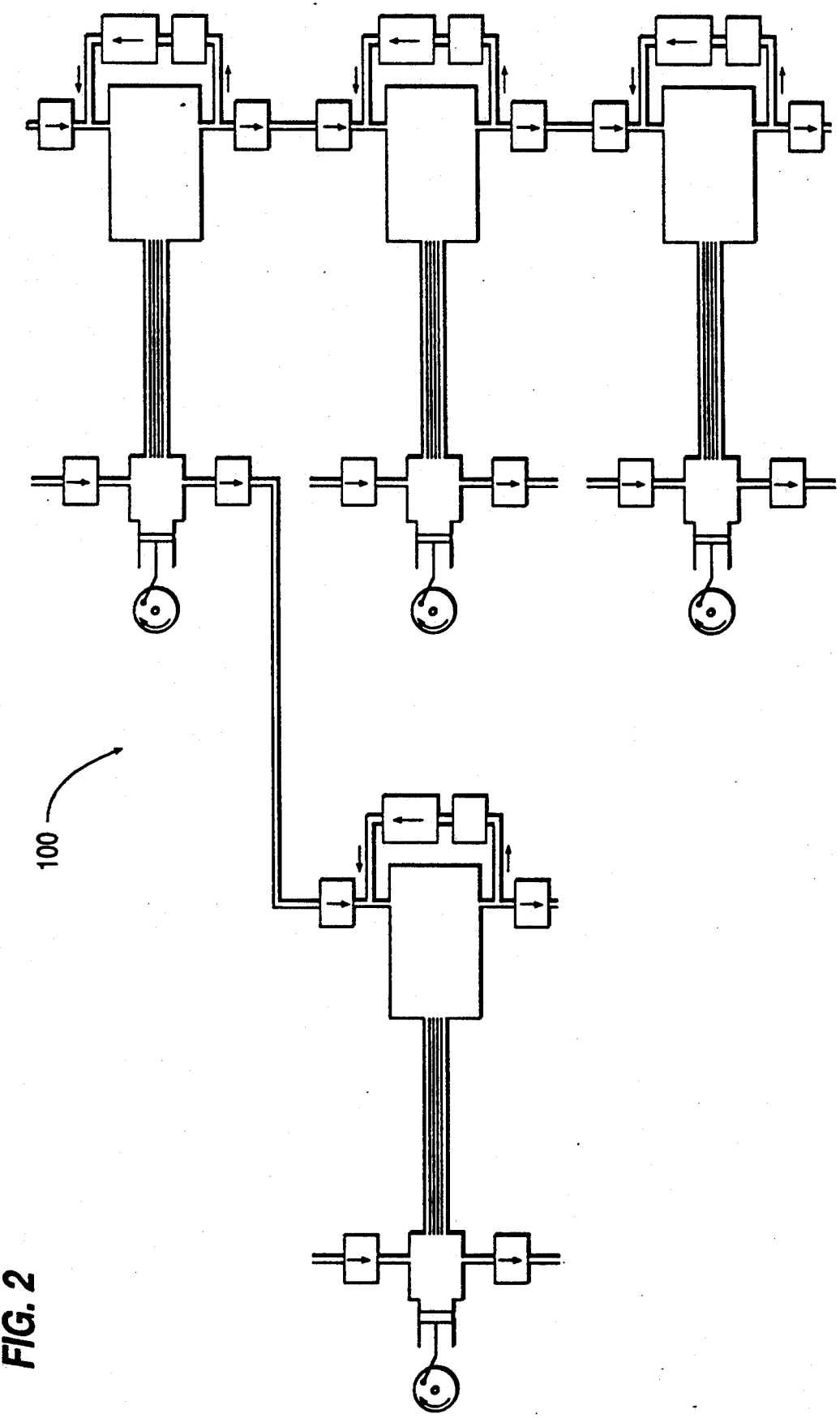
FIG. 2 is a diagrammatical sectional view of an embodiment of a cascade system of the invention.

Referring to FIG. 2, a standard Hertz cascade cycle system 100 is shown, each unit of which is identical to that described in FIG. 1.

It is believed that the principles, operation and exemplary embodiments of the invention will all be understood from the foregoing depiction. Following is a detailed description of an embodiment of a method of the invention.

Reservoir 14 holds the mixture, gaseous or liquid, that is to be separated. The concentration in that container, at the high end of the diffusing path, is designated $c_1$. The reservoir is continuously flushed with the initial mixture of gases or of solutes with a flow rate $Q_0$; the initial concentrations of the substances in the flushing fluid are designated $c_0$, using the superscript L for a light substance and H for a heavy one. $Q_1$ is the outflow out of reservoir 14. Typically, $Q_1$ is enriched in the molecule having the lower coefficient of dispersion; i.e., the lighter molecule when the fluid is a liquid and the heavier molecule when the fluid is a gas.

A reservoir 12, preferably of smaller dimensions, is at the low end of the diffusing path. The reservoir 12 is continuously flushed with pure carrier fluid at an inflowing rate Q. $Q_2$ is the outflow out of reservoir 12. Typically, $Q_2$ is enriched in the component having the higher coefficient of dispersion, typically the heavier molecule when the fluid is a gas and the lighter molecule when the fluid is a liquid.

The diffusing path consists of a number of ducts or capillaries of defined radius a and defined length L. The capillaries connect the two reservoirs 12 and 14. Typically, the conductance $G^H$ of the heavier component in the diffusing path is higher than $G^L$ of the lighter component when the system is a gas. The reverse is true in liquids. G is defined hereinbelow by equation (4).

The pump 42 is connected to reservoir 14 by condenser/evaporator 38. It will be understood by those skilled in the art that use of the condenser/evaporator is only necessary when it is desired to optimize the enrichment of the lighter gas or heavier solute in gaseous or liquid separations, respectively. The condenser/evaporator ultimately condenses carrier fluid at a rate equal to slightly less than $Q_c$ [exactly: rate of condensation=$Q_c-Q_1(1-c_1^L-c_1^H)$]. The mixture is returned after condensation to reservoir 14. $Q_c$ may be varied from zero to any desired value. Typically, $0<Q_c<\sqrt{2} \, G^H$.

The design of the system shown in FIG. 1 provides for the following required fluid motions.

Oscillatory motions of the fluid in the capillaries 24 are generated by the reciprocating pump 26 at a specified frequency $\omega$ and a specified amplitude $\Delta x$.

A steady diffusional motion of molecules takes place from the reservoir 14 with the high concentration of molecules to be separated to the reservoir 12 which is flushed with carrier fluid.

A steady bulk flow of carrier fluid is established from reservoir 12 to reservoir 14. This bulk flow equals $Q_c$ and is directed against the concentration gradient of the molecules to be separated. This steady bulk flow of carrier fluid is generated by using an inflow Q into reservoir 12 that is higher than the outflow $Q_2$ such that $Q_c=Q-Q_2$. The majority of the bulk flow of carrier fluid is ultimately condensed in the condenser/evaporator 38, the remainder leaving the system in $Q_1$.

A steady circulation of the fluid mixture is taken from reservoir 14 through a condenser/evaporator for the purpose of removing the carrier fluid, the fluid being reintroduced into reservoir 14 after condensation.

A steady flow of the original fluid mixture to be separated is injected by pump 46 into reservoir 14. A steady flow of fluid enriched in the component having the lower coefficient of diffusion is removed from reservoir 14 by pump 52. A steady flow of carrier fluid is injected into reservoir 12 by pump 48. A steady flow of fluid mixture enriched in the component having the higher coefficient of diffusion is removed from the reservoir 12 by pump 50.

The oscillations enhance the rate of diffusion. The resulting effective diffusion coefficient $D_{eff}$ is defined, in analogy to the molecular diffusion coefficient, as $$D_{eff}=\dot{q}L/(c_1-c_2)A \qquad (3)$$

This coefficient is orders of magnitude larger than $D_m$ if optimal conditions are established. $D_{eff}$ is dependent on the angular velocity and on the square of oscillation amplitude as described above. In gases, it is inversely proportional to $D_m$. In liquids, it is either proportional or inversely proportional to $D_m$, depending on the angular velocity. In a setup of given length L and area A, equation (3) may be simplified to $$G=\dot{q}/(c_1-c_2) \qquad (4)$$

with $G=D_{eff}A/L$.

The amount of separation obtained with the setup depends, firstly, on the difference in $D_{eff}$ of the substances to be separated. This difference may also be optimized. In addition, the absolute and relative values of the five flows Q, $Q_0$, $Q_1$, $Q_2$ and $Q_c$ play an important role and their effect is different if it is desired to enrich the lighter component or the heavier component. This is indicated by the following equations.

The separation at exit $Q_1$ where the component having the lower coefficient of dispersion is enriched is defined by $$p_1^L = \frac{(c_1/c_0)^L}{(c_1/c_0)^H} = \frac{1 - \dfrac{1}{1 + (Q_1/Q_2)\exp(Q_c/G^L) + Q_1/G^L}}{1 - \dfrac{1}{1 + (Q_1/Q_2)\exp(Q_c/G^H) + Q_1/G^H}} \qquad (5)$$

This relationship is illustrated in FIG. 3 which shows that an incrase of $Q_c$ reduces the separation if the condenser is not active. However, if the condenser is set as described above so that most of the upstream flowing carrier fluid is being condensed, a great improvement of the separation is obtained, this being depicted in FIG. 4.

The separation at exit $Q_2$ where the component having the higher coefficient of dispersion is enriched is defined by $$\rho_2 H = \frac{(c_2/c_0)^H}{(c_2/c_0)^L} = \frac{1 + G^L/Q_1 + (G^L/Q_2)\exp(Q_c/G^L)}{D_{eff}^L/D_{eff}^H + G^L/Q_1 + (G^L/Q_2)\exp(Q_c/G^H)} \quad (6)$$

This relationship is illustrated in FIGS. 5 and 6 which show the effects of $Q_0$, $Q_2$ and $Q_c$. Good separation at this exit does not require the use of a condenser. The figures identify $Q_c$ as the main factor influencing the separation.

The invention is illustrated by the following non-limiting example.

EXAMPLE

The system employed in the following example follows closely the schematic of FIG. 1. Reservoir 14 comprised a 20-liter plastic container. Reservoir 12 was made of a 0.2-liter plastic cylinder. A bundle of 76 capillaries of 0.19 cm radius and 120 cm length each were employed. The frequency of the reciprocating pump was set at 10 Hz; the average oscillation amplitude of the gas in the capillaries was $\Delta x = 23$ cm. A gas mixture $Q_0$ was a mixture of He and $O_2$. The carrier gas was either $CO_2$ or $N_2$. The values of Q, $Q_0$, $Q_1$, $Q_2$ and $Q_c$ are given in the figures. The condenser was replaced by $Ba(OH)_2$ or KOH, either of which reacts chemically with $CO_2$ to yield a non-volatile product.

Results showing the enrichment of the heavier gas using a He/$O_2$ mixture with $N_2$ as the carrier are shown in FIG. 7. The best separation measured was 76.9. This separation exceeds by far the ratio of the square root of the molecular weights of $O_2$ and He ($\sqrt{32/4} = 2.8$), which is an approximate measure of the relative diffusivities and, therefore, of the optimal separation in a standard separation system that does not have the option of counterflow. In other experiments, values of $\rho_2^H$ of 16.6 and 17.5 were obtained using various settings of the flushing flows. The systems and method of the invention offer a separation that exceeds usually accepted optima.

The systems and method of the invention offer a new approach to the problem of separation. The above results far exceed the steady state separation factor of prior methods such as the method used presently to separate uranium isotopes. The invention offers in addition a high yield. Thus, e.g., with $\rho_2^H = 16.6$, the flux of partially enriched $O_2$ was 62 ml/min or 7.2 ml/min per $cm^2$ of the diffusing path. The energy required for the separation is negligibly small (about 14 watts per stage).

The method and systems of the invention permit the separation of gases and solutes of differing molecular weights with a separation factor that is freely adjustable and that exceeds by many times the ratio of the molecular diffusivities of the components. In the above example, the ratio of the molecular diffusivities is exceeded by a factor of 10. The heavier component, i.e., with the higher effective diffusion coefficient, is enriched in the outflow of reservoir 12. The lighter gas is, conversely, enriched in the outflow of reservoir 14.

In the method and systems of the invention, the positive flow of carrier fluid from the second reservoir into the first reservoir is maintained by one or a combination of: (1) maintaining the rate of flow of the carrier fluid into the second fluid reservoir above the rate of withdrawal from the second fluid reservoir of the mixture of carrier fluid and mixture of differing masses enriched in the component having the higher effective coefficient of diffusion; (2) maintaining the rate of withdrawal from the first fluid reservoir of the mixture of carrier gas and mixture of fluids of differing masses enriched in the component having the lower effective coefficient of diffusion above the rate of flow of the mixture of fluids of differing masses into the first fluid reservoir; or (3) maintaining the rate of flow of the carrier fluid into the second fluid reservoir above the rate of withdrawal from the second fluid reservoir of the mixture of carrier fluid and fluid mixture of differing masses enriched in the component having the higher effective coefficient of diffusion and maintaining the rate of withdrawal from the first fluid reservoir of the mixture of carrier fluid and mixture of fluids of differing masses enriched in the component having the lower effective coefficient of diffusion above the rate of flow of the mixture of fluids of differing masses into the first fluid reservoir.

An especially preferred embodiment of the invention comprises conducting multiple cycles in cascade fashion wherein at least one of the mixtures of carrier fluid and mixture enriched in one of the components thereof withdrawn from a reservoir in a previous cycle is fed into a first reservoir in a subsequent cycle whereby each succeeding withdrawn mixture is more enriched in the component than the previously withdrawn mixture. In a cascade, the carrier fluid is recycled after condensation/evaporation.

It is especially preferred to carry out the method of the invention such that the fluid is alternately moved axially in opposite directions within the at least one duct, that extent of movement therewithin being less than one-half the length thereof.

I claim:

1. A method for separating gases or liquids of differing masses from a gas or liquid mixture, respectively, by enhanced diffusion comprising conducting at least one cycle of:

feeding said mixture of gases or liquids of differing masses into a first reservoir which is connected by at least one duct to a second reservoir;

feeding a carrier fluid into said second reservoir;

establishing oscillatory axial movement of fluid within said at least one duct;

withdrawing from said second reservoir a mixture of carrier fluid and a mixture of gases or liquids of differing masses enriched in the component thereof having the higher effective diffusion coefficient; and withdrawing from said first reservoir a mixture of carrier fluid and a mixture of gases or liquids of differing masses enriched in the component thereof having the lower effective diffusion coefficient;

wherein a positive flow of said carrier fluid is maintained from said second reservoir through said at least one duct into said first reservoir by (1) maintaining the rate of flow of said carrier fluid into said second reservoir above the rate of withdrawal from said second reservoir of said mixture of carrier fluid and gas or liquid mixture of differing masses enriched in the component having the higher effective coefficient of diffusion or (2) maintaining the rate of withdrawal from said first reservoir of said mixture of carrier fluid and mixture of gases or liquids of differing masses enriched in said component having the lower effective coefficient of diffusion above the rate of flow of said mixture of gases or liquids of differing masses into said first reservoir.

2. The method of claim 1 wherein said reservoirs are connected by a plurality of ducts.

3. The method of claim 1 wherein said oscillatory axial movement is sinusoidal and tuned to maximize diffusion of one of the components of said mixture.

4. The method of claim 1 comprising removing at least a portion of carrier fluid from said mixture of gases or liquids withdrawn from said first reservoir.

5. The method of claim 4 wherein said carrier fluid removed from said mixture of gases or liquids withdrawn from said first reservoir is recycled to said second reservoir.

6. The method of claim 4 wherein said carrier fluid is removed from said mixture of gases or liquids by condensation.

7. The method of claim 4 wherein at least a portion of said mixture of gases or liquids, following removal of said carrier fluid, is recycled to said first reservoir.

8. The method of claim 1 comprising conducting multiple said cycles in cascade fashion wherein at least one of said mixtures of carrier fluid and gas or liquid mixture enriched in one of said components thereof withdrawn from a reservoir in a previous cycle is fed into a first reservoir in a subsequent cycle, whereby each succeeding withdrawn mixture is more enriched in said component than the previously withdrawn mixture.

9. The method of claim 8 wherein at least a portion of carrier fluid is removed from at least one of said withdrawn mixtures.

10. The method of claim 9 wherein said carrier fluid is removed from said at least one withdrawn mixture by condensation.

11. The method of claim 1 wherein said fluid is alternately moved axially in opposite directions within said at least one duct, that extent of movement therewithin being less than one-half the length thereof.

12. A system for separating fluids of differing masses from a mixture thereof by enhanced diffusion comprising at least one fluid separating device comprising:
a pair of first and second fluid reservoirs, each having fluid inlet and outlet means;
at least one duct connecting said fluid reservoirs;
means for establishing oscillatory axial movement of fluid within said at least one duct;
one of said inlet means being adapted for feeding into said first fluid reservoir said mixture of fluids of differing masses;
the other of said inlet means being adapted for feeding a carrier fluid into said second fluid reservoir;
one of said outlet means being adapted for the withdrawal from said second fluid reservoir a mixture of carrier fluid and a mixture of fluids of differing masses enriched in the fluid component and having the higher effective coefficient of diffusion;
the other of said outlet means being adapted for the withdrawal from said first fluid reservoir of a mixture of carrier fluid and a mixture of fluids of differing masses enriched in said component having the lower effective coefficient of diffusion; and
means for maintaining a positive flow of said carrier fluid from said second fluid reservoir through said at least one duct into said first fluid reservoir, said means comprising (1) means for maintaining the rate of withdrawal from said first fluid reservoir of said mixture of carrier fluid and mixture of fluids of differing masses enriched in said fluid component having the lower effective coefficient of diffusion above the rate of flow of said mixture of fluids of differing masses into said first fluid reservoir or (2) means for maintaining the rate of flow of said carrier fluid into said second fluid reservoir above the rate of withdrawal from said second fluid reservoir of said mixture of carrier fluid and fluid mixture of differing masses enriched in the fluid component having the higher effective coefficient of diffusion.

13. The system of claim 12 comprising a plurality of said ducts connecting said fluid reservoirs.

14. The system of claim 12 wherein said means for establishing oscillatory axial movement establishes a sinusoidal movement.

15. The system of claim 12 wherein at least one of said outlet means is connected to means for removing at least a portion of said carrier fluid from said withdrawn fluid mixture.

16. The system of claim 15 wherein said means for removing carrier fluid is a condenser.

17. The system of claim 15 additionally comprising means for recycling said removed carrier fluid to at least one of said fluid reservoirs.

18. The system of claim 12 comprising multiple said fluid separating devices connected in cascade fashion such that least one of said mixture of carrier fluid and fluid mixture enriched in one of said components thereof withdrawn from a reservoir of a previous fluid separating device is fed into a reservoir of a subsequent fluid separating device, whereby each succeeding withdrawn mixture is more enriched in said component than the previously withdrawn mixture.

19. The system of claim 18 wherein said outlet means of at least one of said multiple fluid separating devices is connected to means for removing at least a portion of said carrier fluid from said withdrawn fluid mixture.

20. The system of claim 19 wherein said means for removing said carrier fluid is a condenser.

21. The system of claim 19 additionally comprising means for recycling said removed carrier fluid to at least one of said reservoirs.

22. The system of claim 12 wherein said means for establishing oscillatory axial movement of fluid within said at least one duct comprises an oscillatory displacement device acting on fluid within one of said reservoirs for causing fluid to alternately move axially in opposite directions within said at least one duct, the extent of fluid movement therewithin being less than one-half the lenght thereof.

23. The system of claim 22 wherein the other of said reservoirs contains a displacement accommodating device acted on by the fluid contained therein.

24. The system of claim 23 wherein said displacement accommodating device comprises a passive resilient member.

25. The system of claim 24 wherein said passive resilient member is a membrane.

26. A method for separating solutes or particulates of differing masses from a mixture thereof contained in a liquid and from each other by enhanced diffusion comprising conducting at least one cycle of:

feeding a first liquid containing a member selected from the group consisting of a mixture of said solutes of differing masses to be separated, a mixture of particulates of differing masses to be separated or a mixture of at least one solute and at least one particulate of differing masses to be separated into a first reservoir which is connected by at least one duct to a second reservoir;

feeding into said second reservoir a second carrier liquid capable of receiving and containing said solutes or particulates;

establishing oscillatory axial movement of liquid within said at least one duct;

withdrawing from said second reservoir a liquid containing said member enriched in the components thereof having a higher effective coefficient of diffusion;

withdrawing from said first reservoir a liquid containing said member enriched in the components thereof having a lower effective coefficient of diffusion;

wherein a positive flow of said carrier liquid is maintained from said second reservoir through said at least one duct into said first reservoir by (1) maintaining the rate of flow of said carrier liquid into said second reservoir above the rate of withdrawal from said second reservoir of said liquid containing said member enriched in the components thereof having a higher effective coefficient of diffusion or (2) maintaining the rate of withdrawal from said first reservoir of said liquid containing said member enriched in the heavier of said mixture components above the rate of flow of said liquid into said first reservoir.

27. The method of claim 26 wherein said reservoirs are connected by a plurality of ducts.

28. The method of claim 26 wherein said oscillatory axial movement is sinusoidal and tuned to maximize diffusion of one of the components of said mixture.

29. The method of claim 26 comprising removing at least a portion of carrier liquid from said liquid withdrawn from said first reservoir.

30. The method of claim 29 wherein said carrier liquid removed from said liquid withdrawn from said first reservoir is recycled to said second reservoir.

31. The method of claim 29 wherein said carrier liquid is removed from said liquid by evaporation.

32. The method of claim 29 wherein at least a portion of said mixture of liquids, following removal of said carrier fluids, is recycled to said first liquid reservoir.

33. The method of claim 26 comprising conducting multiple said cycles in cascade fashion wherein at least one of said liquids containing a member enriched in one of said mixture components thereof withdrawn from a reservoir in a previous cycle is fed into a reservoir in a subsequent cycle, whereby each succeeding withdrawn mixture is more enriched in said component than the previously withdrawn liquid.

34. The method of claim 33 wherein at least a portion of carrier liquid is removed from at least one of said withdrawn liquids.

35. The method of claim 34 wherein said carrier liquid is removed from said at least one withdrawn liquid by evaporation.

36. The method of claim 26 wherein said liquid is alternately moved axially in opposite directions within said at least one duct, that extent of movement therewithin being less than one-half the length thereof.

37. A method for separating solutes or particulates of differing masses from a mixture thereof contained in a gas and from each other by enhanced diffusion comprising conducting at least one cycle of:

feeding a first gas containing a member selected from the group consisting of a mixture of said gases of different masses to be separated, a mixture of particulates of differing masses to be separated or a mixture of at least one gas and at least one particulate of differing masses to be separated into a first reservoir which is connected by at least one duct to a second reservoir;

feeding into said second reservoir a second carrier gas capable of receiving and containing said gas or particulates to be separated;

establishing oscillatory axial movement of liquid within said at least one duct;

withdrawing from said second reservoir a gas containing said member enriched in the components thereof having a higher effective coefficient of diffusion;

withdrawing from said first reservoir a gas containing said member enriched in the components thereof having a lower effective coefficient of diffusion;

wherein a positive flow of said carrier gas is maintained from said second reservoir through said at least one duct into said first reservoir by (1) maintaining the rate of flow of said carrier gas into said second reservoir above the rate of withdrawal from said second reservoir of said gas containing said member enriched in the components thereof having a higher effective coefficient of diffusion or (2) maintaining the rate of withdrawal from said first reservoir of said gas containing said member enriched in the heavier of said mixture components above the rate of flow of said gas into said first reservoir.

38. The method of claim 37 wherein said reservoirs are connected by a plurality of ducts.

39. The method of claim 37 wherein said oscillatory axial movement is sinusoidal and tuned to maximize diffusion of one of the components of said mixture.

40. The method of claim 37 comprising removing at least a portion of carrier gas from said gas withdrawn from said first reservoir.

41. The method of claim 40 wherein said carrier gas removed from said gas withdrawn from said first reservoir is recycled to said second reservoir.

42. The method of claim 40 wherein said carrier gas is removed from said liquid by condensation.

43. The method of claim 37 comprising conducting multiple said cycles in cascade fashion wherein at least one of said gases containing a member enriched in one of said mixture components thereof withdrawn from a reservoir in a previous cycle is fed into a reservoir in a subsequent cycle, whereby each succeeding withdrawn mixture is more enriched in said component than the previously withdrawn gas.

44. The method of claim 43 wherein at least a portion of carrier gas is removed from at least one of said withdrawn gases.

45. The method of claim 44 wherein said carrier gas is removed from said at least one withdrawn gas by evaporation.

46. The method of claim 37 wherein said gas is alternately moved axially in opposite directions within said at least one duct, that extent of movement therewithin being less than one-half the length thereof.

* * * * *

UNITED STATES PATENT AND TRADEMARK OFFICE
CERTIFICATE OF CORRECTION

PATENT NO. : 5,190,667
DATED : March 2, 1993
INVENTOR(S) : Marc J. JAEGER

It is certified that error appears in the above-identified patent and that said Letters Patent is hereby corrected as shown below:

On the title page, under [56] References Cited, OTHER PUBLICATIONS, please correct "Marc J. Saeger et al" to read -- Marc J. Jaeger et al --

In column 10, line 56 [claim 22, line 8], please correct "lenght" to read -- length --

Signed and Sealed this

First Day of February, 1994

Attest:

BRUCE LEHMAN

*Attesting Officer*     *Commissioner of Patents and Trademarks*